(12) United States Patent
Okuda et al.

(10) Patent No.: US 12,604,222 B2
(45) Date of Patent: Apr. 14, 2026

(54) COMMUNICATION ABNORMALITY DETERMINATION DEVICE, METHOD, STORAGE MEDIUM, AND VEHICLE

(71) Applicant: TOYOTA JIDOSHA KABUSHIKI KAISHA, Toyota (JP)

(72) Inventors: Masataka Okuda, Toyota (JP); Kaoru Yoshida, Nisshin (JP); Kanade Kuriyama, Toyota (JP); Masatoshi Kakutani, Miyoshi (JP); Toshiki Shinohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 18/204,693

(22) Filed: Jun. 1, 2023

(65) Prior Publication Data

US 2024/0056845 A1     Feb. 15, 2024

(30) Foreign Application Priority Data

Aug. 10, 2022     (JP) ................................. 2022-128018

(51) Int. Cl.
  *H04W 24/08*       (2009.01)
  *H04W 64/00*       (2009.01)
(52) U.S. Cl.
  CPC ........... *H04W 24/08* (2013.01); *H04W 64/00* (2013.01)

(58) Field of Classification Search
  CPC ...... H04W 24/04; H04W 24/08; H04W 64/00
  See application file for complete search history.

(56) References Cited

U.S. PATENT DOCUMENTS

2009/0234582 A1*  9/2009  Figueroa ................. G01S 19/49
                                                                701/472
2017/0039783 A1*  2/2017  Hobel ..................... H04W 4/40
2019/0387564 A1*  12/2019  Kim ..................... H04W 76/14

FOREIGN PATENT DOCUMENTS

JP         2001-307295 A    11/2001
JP         2009-118200 A    5/2009
JP         2010-147754 A    7/2010
JP         2020-091511 A    6/2020

* cited by examiner

*Primary Examiner* — Timothy X Pham
(74) *Attorney, Agent, or Firm* — Oliff PLC

(57)       ABSTRACT

A communication abnormality determination device mounted on a vehicle that communicates with a server includes a detection unit that detects that a communication disruption occurs between the vehicle and the server, and a determination unit that determines a cause of occurrence of the communication disruption based on a communication strength at a first position at which the communication disruption occurs.

9 Claims, 6 Drawing Sheets

COMMUNICATION ABNORMALITY DETERMINATION DEVICE, METHOD, STORAGE MEDIUM, AND VEHICLE

CROSS-REFERENCE TO RELATED APPLICATION

This application claims priority to Japanese Patent Application No. 2022-128018 filed on Aug. 10, 2022 incorporated herein by reference in its entirety.

BACKGROUND

1. Technical Field

The present disclosure relates to a device and the like that determine an abnormality of a communication device and the like used for communication between a vehicle and a server.

2. Description of Related Art

Japanese Unexamined Patent Application Publication No. 2020-091511 (JP 2020-091511 A) discloses a vehicle information management system capable of automatically determining and notifying the reason for disruption when a communication disruption occurs in a communication device mounted on a vehicle. The above document describes that, in this vehicle information management system, when a communication disruption is detected between the vehicle and the server, the reason for disruption is determined to be a vehicle failure as long as the position of the vehicle is within a repair shop area.

SUMMARY

With the technique described in JP 2020-091511 A, it is not possible to determine whether the vehicle has failed until the vehicle moves into the repair shop area. For this reason, there is a possibility that the determination of the cause of the communication disruption between the vehicle and the server is delayed.

The present disclosure has been made in view of the above problem, and an object thereof is to provide a communication abnormality determination device and the like that can quickly determine the cause of a communication disruption occurring between a vehicle and a server.

In order to solve the above issue, an aspect of the technique of the present disclosure is a communication abnormality determination device mounted on a vehicle that communicates with a server, and includes: a detection unit that detects that a communication disruption occurs between the vehicle and the server, and a determination unit that determines a cause of occurrence of the communication disruption based on a communication strength at a first position at which the communication disruption occurs.

According to the communication abnormality determination device and the like of the present disclosure, it is possible to quickly determine the cause of occurrence of the communication disruption between the vehicle and the server.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

When a communication disruption occurs between a vehicle and a server, a communication abnormality determination device according to the present disclosure mounted on the vehicle determines whether a cause of the communication disruption is dependent on a communication environment or is based on an abnormality of a communication device or the like, based on information acquired in advance on communication strength at a location where the communication disruption occurs. Hereinafter, an embodiment of the present disclosure will be described in detail with reference to the drawings.

EMBODIMENT

Configuration

Figure 1:
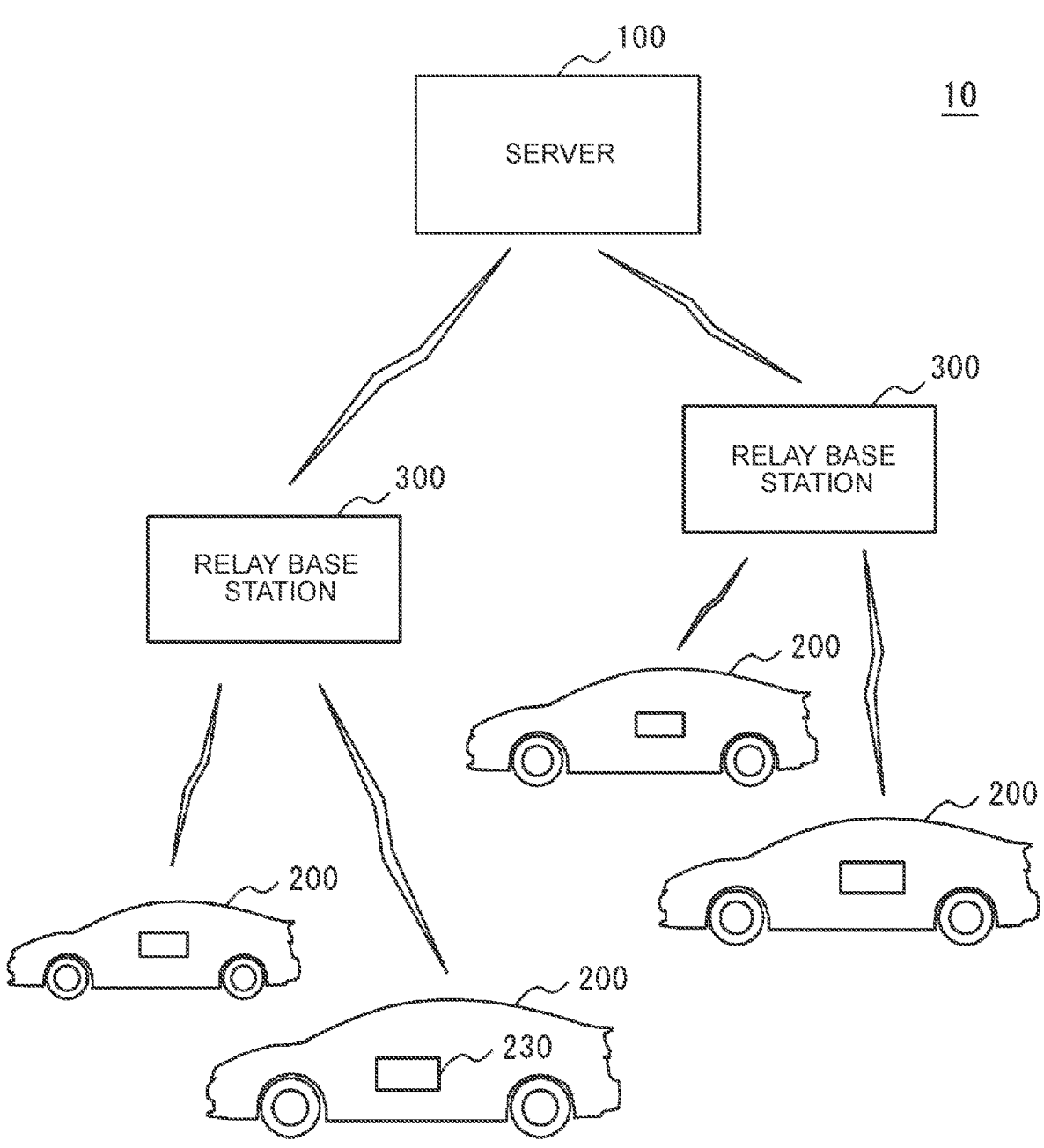
FIG. 1 is a diagram showing a schematic configuration of a communication system including a plurality of vehicles each equipped with a communication abnormality determination device according to an embodiment.

FIG. 1 is a diagram showing a schematic configuration of a communication system 10 including a plurality of vehicles 200 each equipped with a communication abnormality determination device 230 according to an embodiment of the present disclosure. The communication system 10 exemplified in FIG. 1 is configured to include a server 100, the vehicles 200, and a plurality of relay base stations 300.

(1) Server

The server 100 is configured to be able to communicate with the vehicles 200 via the relay base stations 300. The server 100 receives from each of the vehicles 200 information related to a state of each vehicle (vehicle position, speed, traveling direction, etc.), information related to surroundings of each vehicle (video data, sonar values), and information related to a communication state at the position of each vehicle (communication strength, presence or absence of a communication disruption, etc.) through communication. Then, the server 100 sequentially accumulates the information acquired from the vehicles 200 in a database (for example, a digital twin or a communication quality map database) that is not shown, and provides the vehicle 200 requiring information with the accumulated information as current or future communication environment information. As the communication environment information to be accumulated, information on communication strength history at each location (vehicle position) can be exemplified. Further, the server 100 can transmit information on required communication environment information and information related to required communication (such as a communication disruption warning) to the vehicles 200 and the like. As the server 100, a cloud server configured on the cloud can be exemplified.

Note that, the number of servers 100 constituting the communication system 10 is not limited to one, and two or more servers 100 may be provided in accordance with a predetermined area or region.

(2) Relay Base Station

The relay base stations 300 constitute a configuration (relay device) for relaying communication performed between the vehicles 200 and the server 100. The communication between the relay base stations 300 and the server 100 may be performed wirelessly or by wire. Each relay base station 300 can perform wireless communication with one or two or more vehicles 200 present in each communication area that is an area where each relay base station 300 is communicable. Further, each relay base station 300 provides a cell identification (ID) that is information for identifying the corresponding relay base station 300 to the server 100 and vehicle 200 with which communication is performed.

(3) Vehicle

The vehicles 200 are mobilities configured to be able to communicate with server 100 via the relay base stations 300. The vehicles 200 can provide the server 100 with the information related to the state of the own vehicle, the information related to the surroundings of the own vehicle, and the like. The information related to the state of the own vehicle includes the position of the vehicle, the speed of the vehicle, the traveling direction of the vehicle, and the like. The information related to the surroundings of the own vehicle includes images in front of and behind the vehicle 200, sonar values around the vehicle 200, and the like. Further, the vehicles 200 can receive communication environment information (communication strength) and information related to communication (communication disruption warning, etc.) from the server 100.

Figure 2:
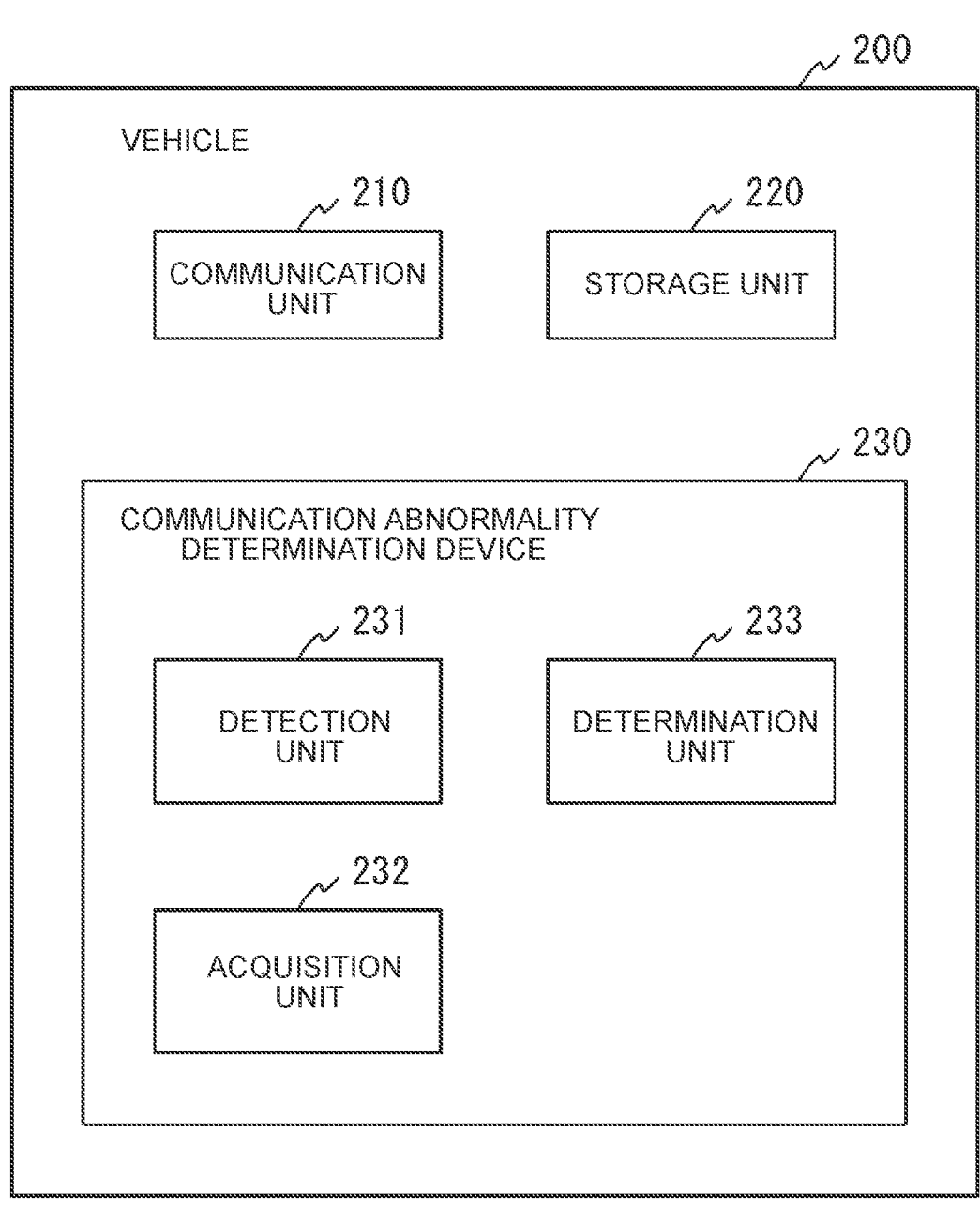
FIG. 2 is a functional block diagram of the vehicle equipped with the communication abnormality determination device.

FIG. 2 is an example of a functional block diagram of each vehicle 200. The vehicle 200 exemplified in FIG. 2 includes a communication unit 210, a storage unit 220, and the communication abnormality determination device 230 according to the present embodiment.

The communication unit 210 communicates with the server 100 via the relay base station 300 to transmit the information related to the state of the vehicle (vehicle position, speed, traveling direction, etc.) and the information related to the communication state at the position of the vehicle (communication strength, presence or absence of a communication disruption, etc.) to the server 100. Further, the communication unit 210 communicates with the server 100 via the relay base station 300, and receives the communication environment information (communication strength) and the information related to communication (communication disruption warning, etc.) from the server 100. The vehicle 200 communicates with the server 100 via the relay base station 300 of which communication area includes the current position of the vehicle.

The storage unit 220 stores information related to the communication state received by the communication unit 210 from the server 100 via the relay base station 300. Specifically, the storage unit 220 stores the communication strength at the current position of the vehicle 200 and in an area where there is a possibility that the vehicle 200 travels in the future, including a scheduled traveling route of the vehicle 200 (for example, within a radius of XX km from the position of the vehicle 200).

The communication abnormality determination device 230 is a configuration for determining an abnormality in a communication device (such as the communication unit 210) used for communication between the vehicle 200 and the server 100. This communication abnormality determination device 230 includes a detection unit 231, an acquisition unit 232, and a determination unit 233.

The communication abnormality determination device 230 is typically configured as an electronic control unit (ECU) including a processor, a memory, an input-output interface, and the like. This electronic control unit can realize all or some of the functions performed by the detection unit 231, the acquisition unit 232, and the determination unit 233 when the processor reads and executes the program stored in the memory.

The detection unit 231 detects that a communication disruption occurs between the vehicle 200 and the server 100, that is, that communication that the vehicle 200 performs with the relay base station 300 within the communication area is disrupted. Occurrence of the communication disruption can be determined by an event that the vehicle 200 no longer receives a signal from the relay base station 300 with which the vehicle 200 communicates. The time at which the signal is determined to be no longer received may be an instantaneous and extremely short time, or may be a first time longer than that. Further, the detection unit 231 further detects that a continuous communication disruption that is a state in which a state of the above communication disruption continues for a second time that is longer than the first time occurs.

When the detection unit 231 detects occurrence of the continuous communication disruption, the acquisition unit 232 acquires from the storage unit 220 the communication strength at the position of the vehicle 200 at the time of detection and the communication strength in the area where there is a possibility that the vehicle 200 travels including the planned traveling route of the vehicle 200. Note that when the communication strength of the corresponding area is not stored in the storage unit 220, the acquisition unit 232 may acquire the communication strength in the corresponding area from the server 100 via the communication unit 210.

The determination unit 233 determines the cause of occurrence of the continuous communication disruption detected by the detection unit 231 based on the communication strength acquired by the acquisition unit 232. More specifically, the determination unit 233 determines whether occurrence of the communication disruption is caused by that the communication strength at the vehicle position (or in the communication area) at the time of detection is actually weak, or is caused by an abnormality of any of the communication devices of the server 100, the vehicle 200, and the relay base station 300. Further, when the determination unit 233 determines that an abnormality in at least any one of the communication devices (communication environment) of the server 100, the vehicle 200, and the relay base station 300 is the cause of occurrence of the communication disruption, the determination unit 233 further specifies which communication device (communication environment) is abnormal. Abnormality determination control executed by the determination unit 233 will be described later.

Control

Figure 3:
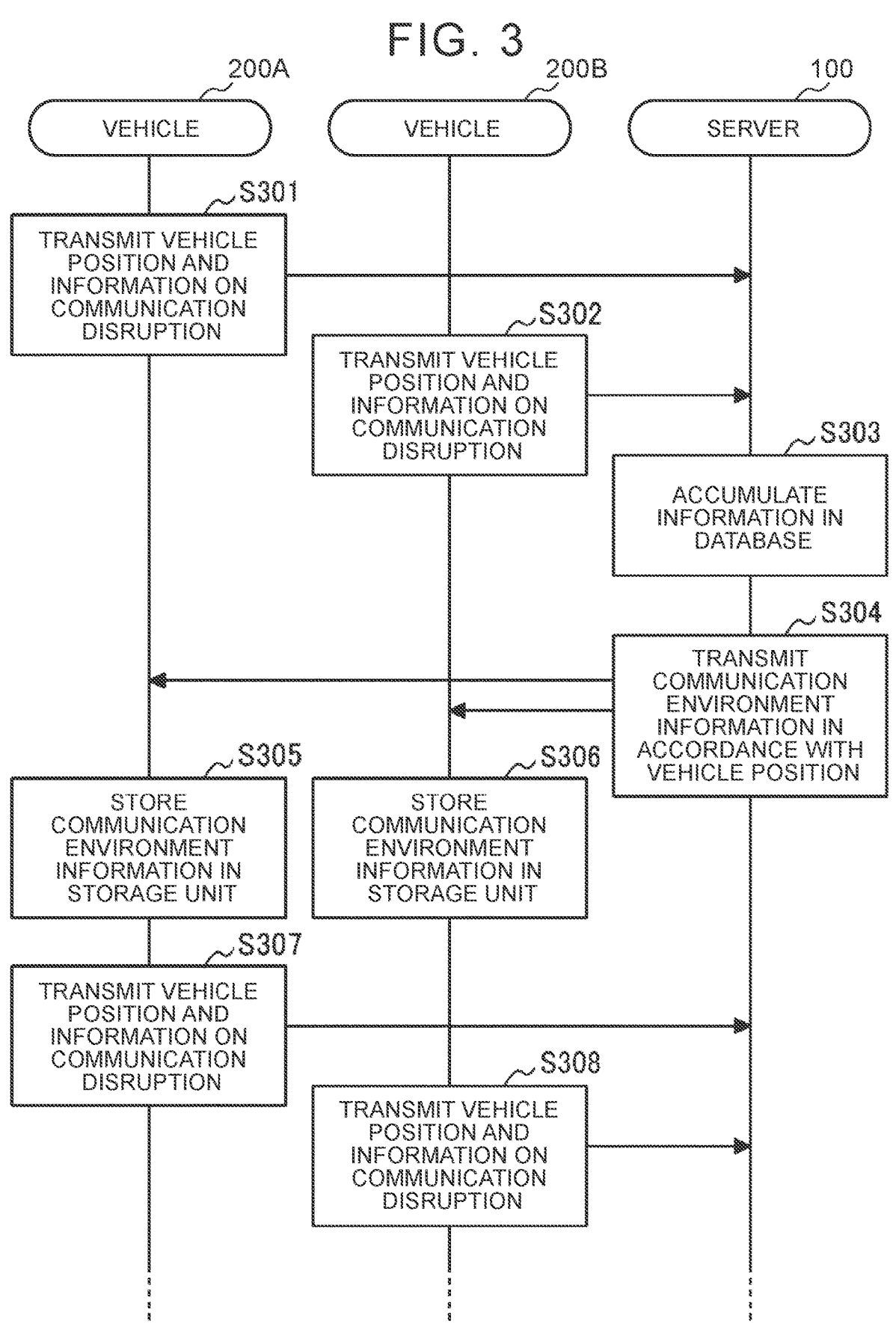
FIG. 3 is a processing sequence for describing communication performed by the vehicles and the server.
Figure 4:
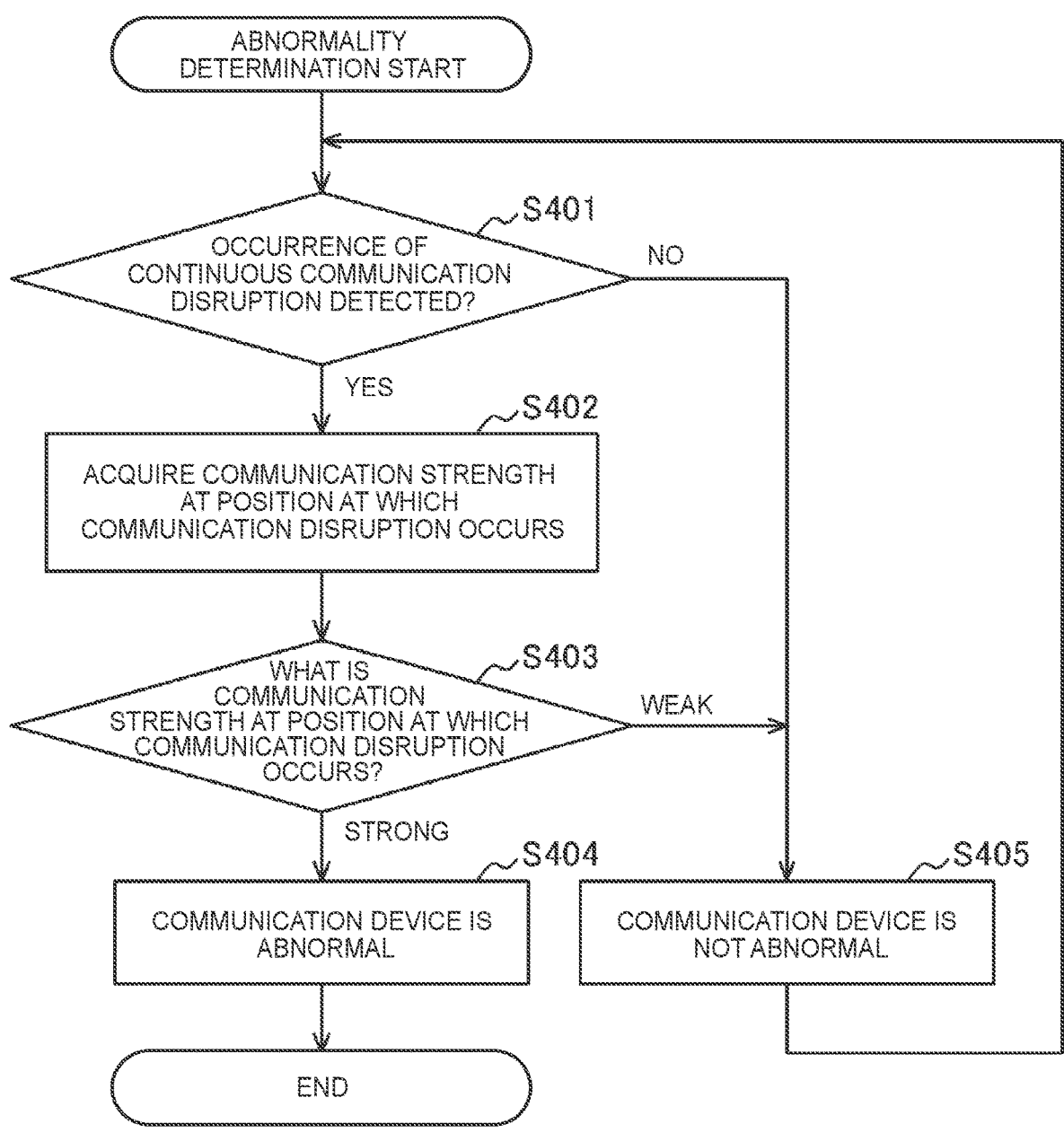
FIG. 4 is a processing flowchart for describing abnormality determination control executed by the communication abnormality determination device.
Figure 5A:
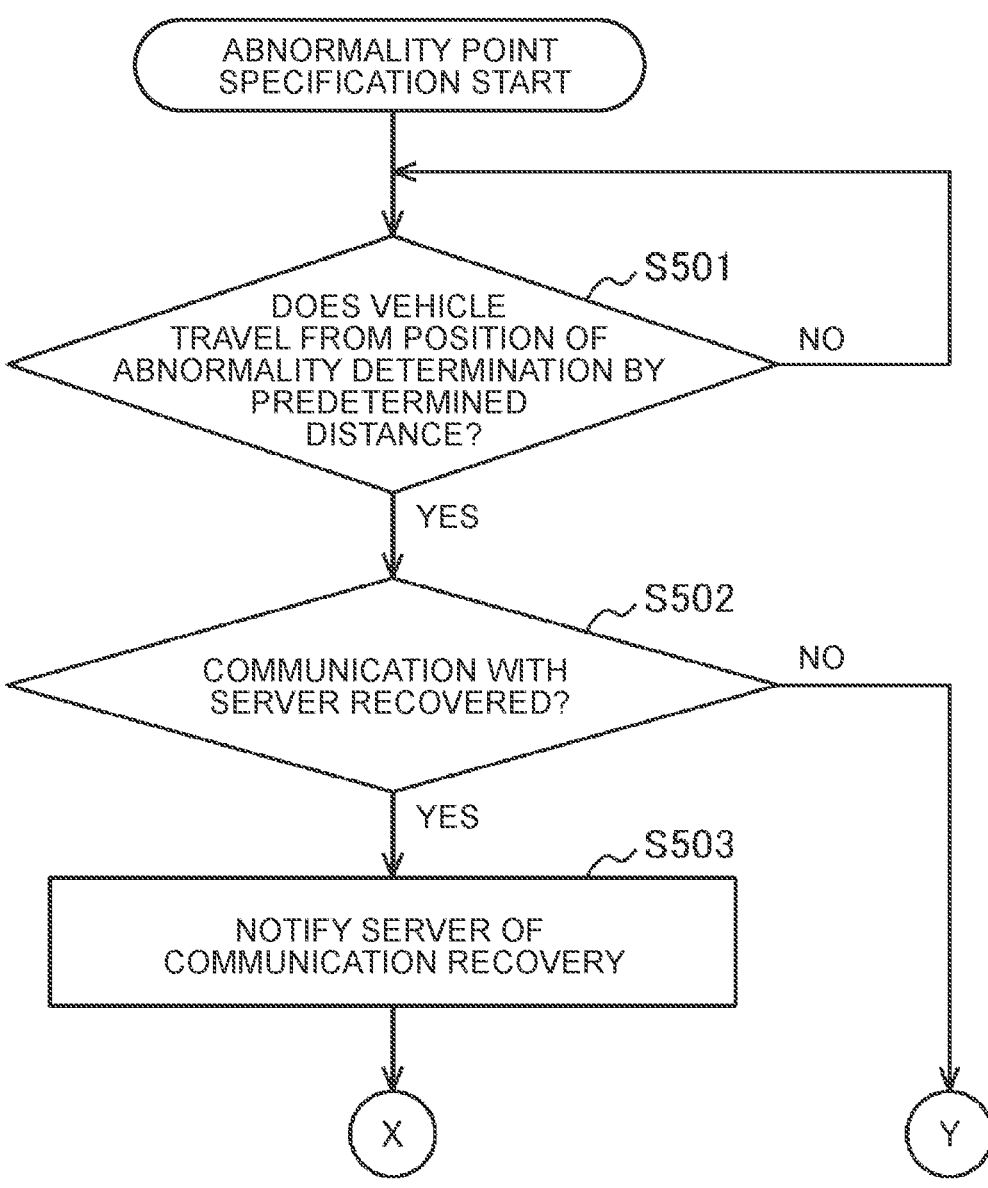
FIG. 5A is a processing flowchart for describing abnormal point specification control executed by the vehicle determined to be abnormal and the server.
Figure 5B:
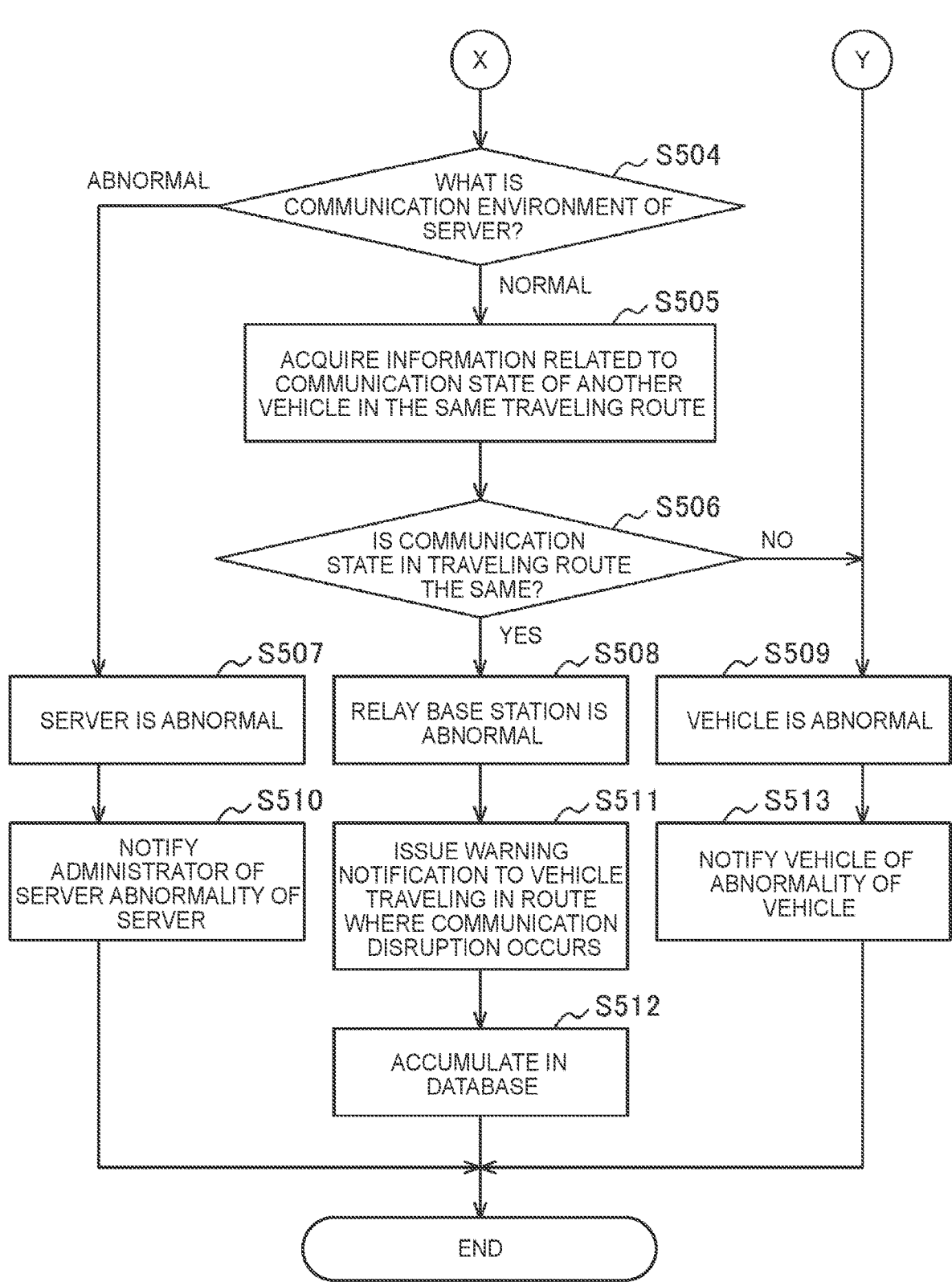
FIG. 5B is a processing flowchart for describing the abnormal point specification control executed by the vehicle determined to be abnormal and the server.

With reference to FIGS. 3, 4, 5A, and 5B further, control executed by the communication system 10 including the vehicles 200 each equipped with the communication abnormality determination device 230 according to the present embodiment will be described. FIG. 3 is a processing sequence explaining constant communication performed between the vehicles 200 (communication abnormality determination devices 230) and the server 100. FIG. 4 is a processing flowchart for describing the abnormality determination control executed by the communication abnormality determination device 230 of each vehicle 200. FIGS. 5A and 5B show a processing flowchart for describing abnormal point specification control executed by the vehicle 200 determined to be abnormal and the server 100.

(1) Constant Communication

A process of constant communication executed between the vehicles 200 and the server 100 will be described with reference to FIG. 3. The processing sequence exemplified in FIG. 3 describes constant communication performed between two vehicles 200 (denoted as a vehicle 200A and a vehicle 200B) and the server 100. In this sequence, description of the relay base station 300 that relays communication between the vehicle 200 and the server 100 is omitted.

Step S301

The communication unit 210 of the vehicle 200A transmits to the server 100 the current position of the vehicle 200A and the information related to the communication state including the presence or absence of communication disruption at that position.

Step S302

The communication unit 210 of the vehicle 200B transmits to the server 100 the current position of the vehicle 200B and the information related to the communication state including a presence or absence of the communication disruption at that position.

Step S303

The server 100 receives the current position and the information related to the communication state including a presence or absence of the communication disruption at that position from each of the vehicle 200A and the vehicle 200B, and accumulates the received information in a database.

Step S304

The server 100 extracts from the database the current position of the vehicle 200A and the communication environment information (communication strength, communication disruption history, etc.) in the area where there is a possibility that the vehicle 200A travels in the future, and transmits the information to the vehicle 200A. Further, the server 100 extracts from the database the current position of the vehicle 200B and the communication environment information (communication strength, communication disruption history, etc.) in the area where there is a possibility that the vehicle 200B travels in the future, and transmits the information to the vehicle 200B.

Step S305

The communication unit 210 of the vehicle 200A receives the communication environment information from the server 100 and stores the received information in the storage unit 220.

Step S306

The communication unit 210 of the vehicle 200A receives the communication environment information from the server 100 and stores the received information in the storage unit 220.

From step S307 onward, the processes in steps S301 to S306 are repeated.

Through this constant communication, the vehicles 200 (the vehicle 200A and the vehicle 200B) each can always retain the current position of the own vehicle, the information such as the communication strength in the vicinity of the current position and a history of occurrence of the communication disruption, etc., before the communication disruption occurs.

(2) Abnormality Determination Control

The abnormality determination control executed by the communication abnormality determination device 230 of each vehicle 200 will be described with reference to FIG. 4. The abnormality determination control shown in FIG. 4 is started, for example, when the detection unit 231 detects that the communication disruption occurs between the vehicle 200 and the server 100.

Step S401

The detection unit 231 of the communication abnormality determination device 230 determines whether occurrence of the continuous communication disruption that is the state where the state of the communication disruption continues for a predetermined time is detected. When the detection unit 231 detects occurrence of the continuous communication disruption (YES in step S401), the process proceeds to step S402. On the other hand, when the detection unit 231 does not detect occurrence of the continuous communication disruption (NO in step S401), the process proceeds to step S405.

Step S402

The acquisition unit 232 of the communication abnormality determination device 230 acquires from the storage unit 220 the communication strength (included in the communication environment information) at the position (first position) of the vehicle 200 when the continuous communication disruptions occur. When the acquisition unit 232 acquires the communication strength at the position of the vehicle 200 when the continuous communication disruption occurs, the process proceeds to step S403.

Step S403

The determination unit 233 of the communication abnormality determination device 230 determines whether the communication strength at the position of the vehicle 200 when the continuous communication disruption occurs is strong or weak. Specifically, the determination unit 233 determines whether the communication strength is equal to or greater than a predetermined threshold value. This determination is made to determine whether the communication disruption detected in step S401 is physically correct. Therefore, the threshold value is set to a predetermined communication strength at which it is inevitable that a communication disruption occurs when the threshold value becomes further lower. When the determination unit 233 determines that the communication strength at the vehicle position when the continuous communication disruption occurs is equal to or greater than the threshold value (STRONG in step S403), the possibility that the communication disruption occurs is expected to be low, and the process proceeds to S404. On the other hand, when the determination unit 233 determines that the communication strength at the vehicle position when the continuous communication disruption occurs is less than the threshold value (WEAK in step S403), the possibility that the communication disruption occurs is expected to be high, and the process proceeds to S405.

Step S404

The determination unit 233 of the communication abnormality determination device 230 determines that at least any one of the communication devices of the server 100, the vehicle 200, and the relay base station 300 is abnormal. When the determination unit 233 determines that the communication device is abnormal, the abnormality determination control ends.

Step S405

The determination unit 233 of the communication abnormality determination device 230 determines that any one of the communication devices of the server 100, the vehicle 200, and the relay base station 300 is not abnormal. When the determination unit 233 determines that the communication device is not abnormal, the process proceeds to step S401.

Through the abnormality determination control, it is possible to easily determine whether occurrence of the continuous communication disruption is caused by changes in the communication strength depending on the communication environment, or caused by an abnormality in at least any one of the communication devices of the server 100, the vehicle 200, and the relay base station 300.

(3) Abnormal Point Specification Control

The abnormal point specification control executed by the vehicle 200 determined to be abnormal and the server 100 will be described with reference to FIGS. 5A and 5B. The processes of FIG. 5A and the processes of FIG. 5B are connected by connectors X and Y. The abnormal point specification control shown in FIGS. 5A and 5B is started when the communication abnormality determination device 230 determines that at least any one of the communication devices of the server 100, the vehicle 200, and the relay base station 300 is abnormal in the above-described abnormality determination control (step S404 in FIG. 4).

In the following description, the vehicle 200 determined to be abnormal is referred to as "vehicle 200A", and another vehicle 200 than the vehicle 200A is referred to as "vehicle 200B". Also, the relay base station 300 with which the vehicle 200 communicates when occurrence of an abnormality is detected is referred to as "relay base station 300A", and another relay base station 300 than the relay base station 300A is referred to as "relay base station 300B".

Step S501

The determination unit 233 of the vehicle 200A determines whether the vehicle 200A travels to a position (second position) that is distant from the position (first position) where the vehicle 200A is located when the determination unit 233 determines that at least any one of the communication devices of the server 100, the vehicle 200A, and the relay base station 300A has an abnormality. The determination is made to determine whether the vehicle 200A moves away from the location where the communication disruption occurs and to the location where communication disruption does not occur. Therefore, the predetermined distance is preferably a linear distance (such as a radius) from the first position at which the vehicle 200A is located. When the determination unit 233 determines that the vehicle 200A travels from the first position at which an abnormality is determined to the second position (YES in step S501), the process proceeds to step S502.

Step S502

The determination unit 233 of the vehicle 200A determines whether occurrence of the continuous communication disruption is no longer detected in the detection unit 231, that is, communication between the vehicle 200A and the server 100 is recovered while the vehicle 200A travels from the first position at which an abnormality is determined to the second position that is distant away from the first position by the predetermined distance. The determination is made to reconfirm the communication state between the vehicle 200A and the server 100 at the relay base station 300B other than the relay base station 300A. Therefore, it is desirable that the predetermined distance be a distance that allows at least to escape from the communication area of the relay base station 300A, in addition to being the linear distance described above. When the determination unit 233 determines that communication between the vehicle 200A and the server 100 is recovered while the vehicle 200A moves from the first position to the second position (YES in step S502), the process proceeds to step S503. On the other hand, when the determination unit 233 determines that communication between the vehicle 200A and the server 100 is not recovered while the vehicle 200A moves from the first position to the second position (No in step S502), the process proceeds to step S509.

Step S503

The communication unit 210 of the vehicle 200A notifies the server 100 that communication between the vehicle 200A and the server 100 is recovered while the vehicle 200A moves from the first position to the second position via the relay base station 300B (or the relay base station 300A). When the communication unit 210 notifies that communication with the server 100 is recovered, the process proceeds to step S504.

Step S504

The server 100 confirms the communication environment of the server 100 upon receipt of the communication recovery notification from the vehicle 200A. Specifically, the server 100 determines whether the cloud environment related to communication is operating normally, such as malfunction of hardware such as its own communication device, or failure of software such as application. When the server 100 determines that there is no problem in the communication environment (NORMAL in step S504), the process proceeds to step S505. On the other hand, when the server 100 determines that there is a problem in the communication environment (ABNORMAL in step S504), the process proceeds to step S507.

Step S505

The server 100 acquires the information related to the communication state of the other vehicle 200B that travels in the same (or similar) route as (or to) the route in which the vehicle 200A travels from the information related to the communication state that is accumulated in the database through the communication between the server 100 and the vehicles 200. When the server 100 acquires the information related to the communication state of the other vehicle 200B on the same traveling route as that of the vehicle 200A, the process proceeds to step S506.

Step S506

The server 100 determines whether the communication state of the route in which the vehicle 200A travels is the same as the communication state when the other vehicle 200B travels in the same route. Specifically, the server 100 determines whether an event in which the communication disruption occurs in the vehicle 200A in the communication area of the relay base station 300A and communication is recovered in the communication area of the relay base station 300B also occurs in the vehicle 200B. When the server 100 determines that the vehicle 200A and the vehicle 200B have the same communication state of the traveling route (YES in step S506), the process proceeds to step S508. On the other hand, when the server 100 determines that the vehicle 200A and the vehicle 200B do not have the same communication state of the traveling route (NO in step S506), the process proceeds to step S509.

Step S507

The server 100 fixes that the cause of the communication disruption between the vehicle 200A and the server 100 is an abnormality of the server 100 itself. When the server 100 specifies an abnormality in the server 100 itself, the process proceeds to step S510.

Step S508

The server 100 fixes that the cause of the communication disruption between the vehicle 200A and the vehicle 200B and the server 100 is an abnormality of the relay base station 300A. When the server 100 specifies an abnormality in the relay base station 300A, the process proceeds to step S511.

Step S509

The server 100 fixes that the cause of the communication disruption between the vehicle 200A and the server 100 is an abnormality of the vehicle 200A. When the server 100 specifies an abnormality in the vehicle 200A, the process proceeds to step S513.

Step S510

The server 100 notifies an administrator of the server 100 or the like that an abnormality occurs in the server 100. Note that, a notification that the server 100 is abnormal may be transmitted to the vehicle 200 that communicates with the server 100. When the server 100 notifies the server administrator or the like of the abnormality of the server 100, the abnormality point specification control ends.

Step S511

The server 100 issues a notification to warn the vehicle 200 that is traveling and the vehicle 200 that is highly likely to travel in the future in the route where the communication disruption occurs, that is, in the communication area of the relay base station 300A, that the communication is to be disrupted. When the server 100 issues the notification of warning the communication disruption to the vehicle 200 or the like that is traveling or is highly likely to travel in the route where the communication disruption occurs, the process proceeds to step S512.

Step S512

The server 100 accumulates the information (information on the relay base station 300A) related to the route where the communication disruption occurs in the database as the current communication environment information. When the server 100 accumulates in the database the information related to the route where the communication disruption occurs, the abnormal point specification control ends.

Step S513

The server 100 notifies the vehicle 200A that an abnormality occurs in the vehicle 200A. The notification is made for the purpose of instructing a driver of the vehicle 200A or the like to confirm whether there is a failure. When the server 100 notifies the vehicle 200A of the abnormality of the vehicle 200A, the abnormality point specification control ends.

With the abnormal point specification control, it is possible to easily determine which configuration of the server 100, the vehicle 200, and the relay base station 300 causes occurrence of the continuous communication disruption.

Operations and Effects

As described above, with the communication system 10 including the vehicles 200 each provided with the communication abnormality determination device 230 according to the embodiment of the present disclosure, the vehicle 200 communicating with the server 100 via the relay base station 300 acquires the information on the communication strength in the area where the communication with the relay base station 300 is possible from the server 100 in advance. Then, when the continuous communication disruption is detected to occur between the vehicle 200 and the server 100, the communication abnormality determination device 230 determines the cause of occurrence of the communication disruption based on the communication strength that is acquired in advance with respect to the position at which the communication disruption occurs.

Through the process above, it is possible to easily determine whether occurrence of the continuous communication disruption between the vehicle 200 and the server 100 is caused by changes in the communication strength that is dependent on the communication environment, or caused by an abnormality in at least any one of the communication devices of the server 100, the vehicle 200, and the relay base station 300.

Further, with the communication abnormality determination device 230 according to the present embodiment, after the communication device is determined to be abnormal, the communication device determined to be abnormal is specified based on the communication state at another position (second position) to which the vehicle 200 moves by a predetermined distance from the position at which the communication disruption occurs (first position).

With the process, it is possible to determine which abnormal configuration of the server 100, the vehicle 200, and the relay base station 300 causes occurrence of the continuous communication disruption in further details.

Although an embodiment of the technique of the present disclosure has been described above, the present disclosure can be interpreted as, for example, a system including the communication abnormality determination device and the server, a method executed by the communication abnormality determination device provided with a processor and a memory, a program, a computer-readable, non-transitory storage medium that stores the program, or a vehicle provided with the communication abnormality determination device.

The communication abnormality determination device and the like according to the present disclosure can be used in vehicles and the like that communicate with a server via a relay base station.

What is claimed is:

1. A communication abnormality determination device mounted on a vehicle that communicates with a server, comprising:

a detection unit that detects that a communication disruption occurs between the vehicle and the server;

a determination unit that determines a cause of occurrence of the communication disruption based on a communication strength at a first position at which the communication disruption occurs; and an acquisition unit that acquires from the server information on the communication strength in a communication area where communication with the server is possible, wherein the determination unit determines that a communication device of a relay base station that relays the communication between the vehicle and the server is abnormal when the communication strength at the first position acquired in advance by the acquisition unit from the server is equal to or greater than a predetermined threshold value;

wherein:

after the communication device is determined to be abnormal, the determination unit specifies the communication device determined to be abnormal based on a state of communication while the vehicle moves from the first position at which the communication disruption occurs to a second position that is distant away from the first position by a predetermined distance;

when communication between the vehicle and the server is performed while the vehicle is moving to the second position, the determination unit specifies the communication device determined to be abnormal based on a state of communication between another vehicle and the server from the first position to the second position; and the determination unit determines that the communication device that relays the communication between the vehicle and the server at the first position is abnormal when the communication disruption occurs between the other vehicle and the server at the first position and the communication disruption does not occur between the other vehicle and the server while the vehicle moves to the second position.

2. The communication abnormality determination device according to claim 1, wherein the determination unit determines the cause of the occurrence of the communication disruption when the detection unit continuously detects a state of the communication disruption for a predetermined period of time.

3. The communication abnormality determination device according to claim 1, wherein the determination unit determines that a communication device of the vehicle is abnormal when communication between the vehicle and the server is disrupted while the vehicle moves to the second position.

4. The communication abnormality determination device according to claim 1, wherein the determination unit determines that a communication device of the vehicle is abnormal when the communication between the other vehicle and the server is not disrupted while the vehicle moves to the second position.

5. The communication abnormality determination device according to claim 4, wherein the determination unit determines that the communication device of the vehicle is normal when a communication environment of the server causes the occurrence of the communication disruption at the first position.

6. The communication abnormality determination device according to claim 1, wherein the determination unit determines that the communication device of the relay base station is normal when a communication environment of the server causes occurrence of the communication disruption at the first position.

7. A vehicle equipped with the communication abnormality determination device according to claim 1.

8. A method executed by a communication abnormality determination device mounted on a vehicle that communicates with a server, the method comprising:

a step of detecting that a communication disruption occurs between the vehicle and the server;

a step of acquiring from the server information on a communication strength in a communication area where communication with the server is possible; and a step of determining that a communication device is abnormal when the communication strength at a first position at which the communication disruption occurs, the communication strength acquired in advance from the server, is equal to or greater than a predetermined threshold value; and a step of acquiring from the server information on the communication strength in a communication area where communication with the server is possible, wherein it is determined that a communication device of a relay base station that relays the communication between the vehicle and the server is abnormal when the communication strength at the first position acquired in advance from the server is equal to or greater than a predetermined threshold value;

wherein:

after the communication device is determined to be abnormal, the communication device is determined to be abnormal based on a state of communication while the vehicle moves from the first position at which the communication disruption occurs to a second position that is distant away from the first position by a predetermined distance;

when communication between the vehicle and the server is performed while the vehicle is moving to the second position, the communication device is determined to be abnormal based on a state of communication between another vehicle and the server from the first position to the second position; and it is determined that the communication device that relays the communication between the vehicle and the server at the first position is abnormal when the communication disruption occurs between the other vehicle and the server at the first position and the communication disruption does not occur between the other vehicle and the server while the vehicle moves to the second position.

9. A non-transitory storage medium storing a program executed by a computer of a communication abnormality determination device mounted on a vehicle that communicates with a server, the program comprising:

a step of detecting that a communication disruption occurs between the vehicle and the server;

a step of acquiring from the server information on a communication strength in a communication area where communication with the server is possible; and a step of determining that a communication device is abnormal when the communication strength at a first position at which the communication disruption occurs, the communication strength acquired in advance from the server, is equal to or greater than a predetermined threshold value; and a step of acquiring from the server information on the communication strength in a communication area where communication with the server is possible, wherein it is determined that a communication device of a relay base station that relays the communication between the vehicle and the server is abnormal when the communication strength at the first position acquired in advance from the server is equal to or greater than a predetermined threshold value;

wherein:

after the communication device is determined to be abnormal, the communication device is determined to be abnormal based on a state of communication while the vehicle moves from the first position at which the communication disruption occurs to a second position that is distant away from the first position by a predetermined distance;

when communication between the vehicle and the server is performed while the vehicle is moving to the second position, the communication device is determined to be abnormal based on a state of communication between another vehicle and the server from the first position to the second position; and it is determined that the communication device that relays the communication between the vehicle and the server at the first position is abnormal when the communication disruption occurs between the other vehicle and the server at the first position and the communication disruption does not occur between the other vehicle and the server while the vehicle moves to the second position.

\* \* \* \* \*